United States Patent [19]

Anderson

[11] Patent Number: 5,070,582
[45] Date of Patent: Dec. 10, 1991

[54] CHAIN TIGHT CHAIN BINDER

[76] Inventor: Rick Anderson, Margrave Ct., Walnut Creek, Calif. 94596

[21] Appl. No.: 597,787

[22] Filed: Oct. 15, 1990

[51] Int. Cl.$^5$ ............................................. B665 1/00
[52] U.S. Cl. .................................. 24/68 CD; 254/241
[58] Field of Search .......... 24/68 CD, 68 CT, 68 TT, 24/69 TT, 69 T, 71 CTfST; 254/241, 256

[56] References Cited

U.S. PATENT DOCUMENTS

| | | | |
|---|---|---|---|
| 1,911,194 | 5/1933 | Jenkins et al. | 24/68 CT |
| 2,458,375 | 1/1949 | Haubert | 24/68 CT |
| 2,497,805 | 1/1948 | Towse . | |
| 2,563,603 | 12/1945 | Haubert . | |
| 2,620,159 | 12/1952 | Ehnle . | |
| 2,658,721 | 3/1950 | Coffing . | |
| 4,512,062 | 4/1985 | Crook, Jr. | 254/243 |
| 4,756,181 | 7/1988 | Appelgren . | |

FOREIGN PATENT DOCUMENTS 881314  1/1943  France ................. 254/241

Primary Examiner—Katherine Matecki
Attorney, Agent, or Firm—Robert R. Tipton

[57] ABSTRACT

A load binder tool uses a pair of first and second coupler-tension members pivotal connected, at spaced apart centers, to an operating handle. A pair of major gear members engage a pair of minor gear members attached to the first coupler-tension member. A tension connector pin is journaled to both the major gear member and one end of the second coupler-tension member. The rotation of the connector pin about the axis of rotation of the major gear members creates an additional mechanical advantage. This rotation about the axis of rotation of the major gear members also causes the connector pin axis of rotation to be offset relative to the major gear axis of rotation in order to lock the load binder tool in the closed position using the tension applied to the load binding tension members or chains.

5 Claims, 2 Drawing Sheets

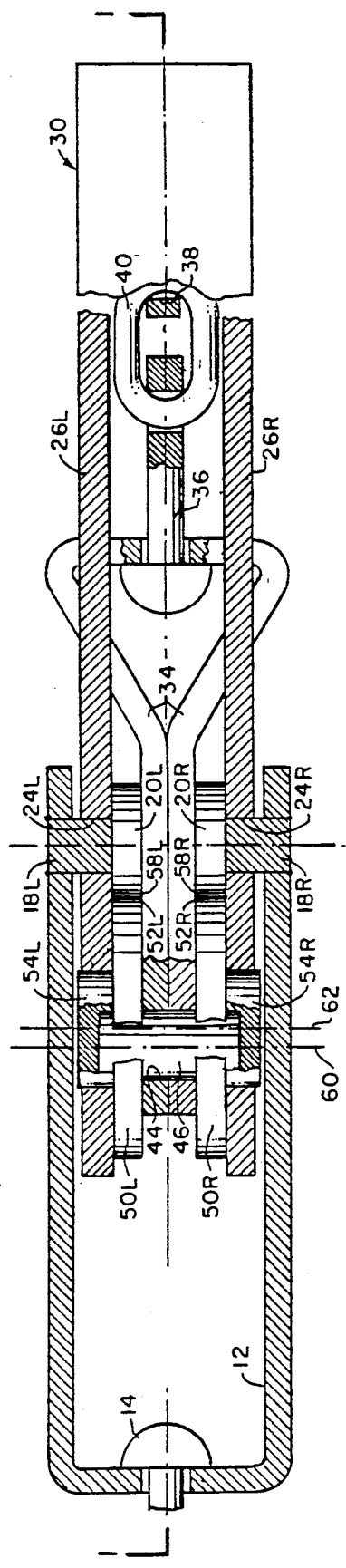
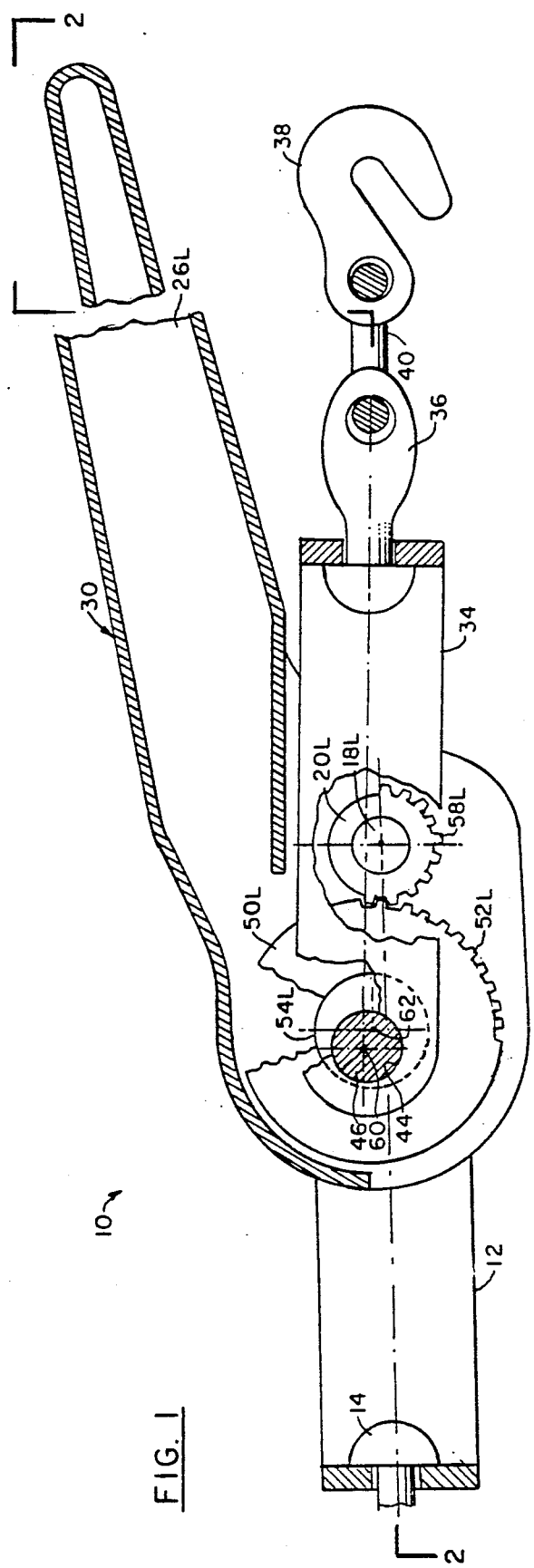

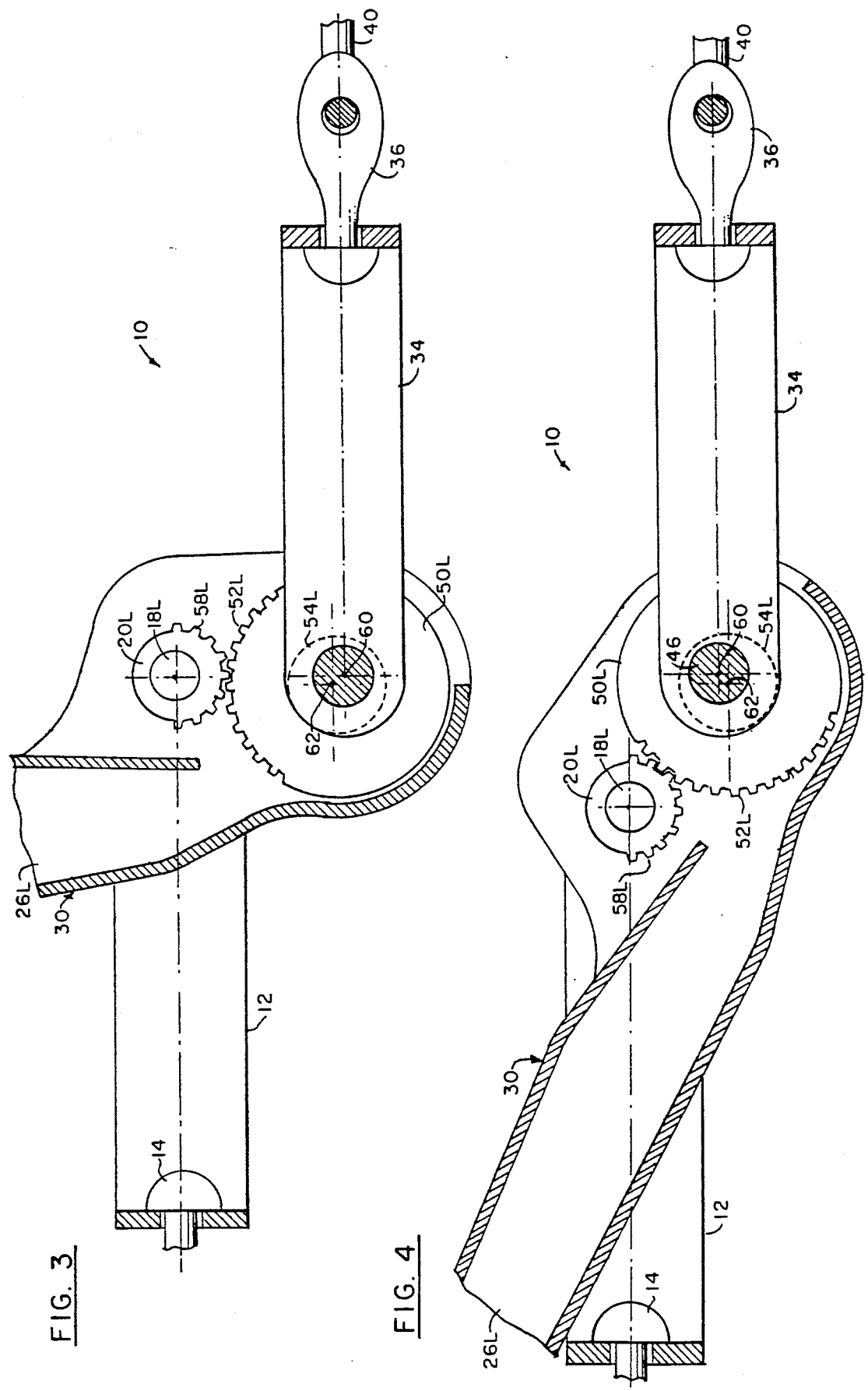

CHAIN TIGHT CHAIN BINDER

BACKGROUND OF THE INVENTION

This invention relates generally to chain binders and in particular to chain binders having a high mechanical advantage and integral locking device.

The load binding tools of the prior art typically used a pair of connector tension members pivotally connected to and spaced part along an operating arm. The mechanical advantage was determined by the ratio of the distance between the points of connection of the connector tension members and the length of the operating arm.

Other load binding devices used mechanical linkages formed into parallelogram configurations. Still other devices included cams and ratchets to gain a mechanical advantage.

A major problem in all the devices was their inability to obtain an improved mechanical advantage and safely lock the device in the closed or fully tensioned condition in one single operation.

SUMMARY OF THE INVENTION

The apparatus of the present invention overcomes the inadequacies of the prior art in that it comprises a major gear adapted to engage a minor gear, with the shafts of each gear journaled to spaced apart bearings in an operating handle. The major gear includes a tension connector pin journaled thereto and having its longitudinal axis of rotation parallel to and spaced apart from the axis of rotation of the major gear. The shaft of the minor gear is attached to a first coupler-tension member that is connected to one load binding tension member. The tension connector pin is journaled to a second coupler-tension member that is connected to the other load binding tension member. Rotation of the operating handle in one direction increases the tension in the two load binding tension members by a combination of movement of the major gear and minor gear shafts in opposite directions toward each other and the rotation of the major gear, and tension connector pin journaled thereto, through a 180 degree arc further pulling the second coupler-tension member in a direction toward the first coupler-tension member. In addition, the rotation of the operating handle to the fully closed position places the tension connector pin axis of rotation relative to the major gear axis of rotation in a position where the tension forces act to lock the operating handle in the closed position.

Rotation of the operating handle in the opposite direction reverses the above described sequence of operation thus unlocking the operating handle and releasing tension on the load binding tension members.

It is, therefore, an object of the present invention to provide a device for increasing the tension between two load binding tension members.

It is a further object of the present invention to provide a device for increasing the tension between two load binding tension members and a locking means integral with the operating mechanism.

It is yet another object of the present invention to provide a device having a high mechanical advantage for increasing the tension between two load binding tension members during the beginning and the end of the operating handle rotation range.

These and other objects of the present invention will be manifest upon study of the following detailed description when taken together with the drawings.

BRIEF DESCRIPTION OF THE DRAWINGS

FIG. 1 is an elevational cross-section of the apparatus for applying tension to a load binding tension member of the present invention with the operating handle shown in the closed or high tension position.

FIG. 2 is a top cross-sectional view of the apparatus for applying tension shown in FIG. 1.

FIG. 3 is an elevational cross-section of the apparatus for applying tension to a load binding tension member of the present invention with the operating handle shown in the half-way position to illustrate the operation of the major and minor gears.

FIG. 4 is an elevational cross-section of the apparatus for applying tension to a load binding tension member of the present invention shown with the operating handle in the fully open (least tension) position to illustrate the operation of the major and minor gears.

DESCRIPTION OF THE PREFERRED EMBODIMENT

With reference to FIG. 1, there is illustrated an elevational cross-section, taken at lines 1—1 of FIG. 2, of a load binding tool 10 used for applying tension to a load binding tension member such as a rope, chain or cable. FIG. 2 is a top sectional view of the load binding tool 10 taken at lines 2—2 of FIG. 1.

Load binding tool 10 comprises a first coupler-tension member 12 having a first coupler link 14 provided at one end for connection to a first load binding tension member common in the art, such as, a chain, rope, cable etc. (not shown). Proximate the other end of coupler-tension member 12, there is attached, on each side, respectively, one end shafts 18 (18R and 18L) of minor gear members 20 (20R and 20L), respectively. Minor gear members 20R and 20L are attached, respectively, proximate the other end of minor gear shafts 18R and 18L. Minor gear shafts 18R and 18L are respectively journaled to minor gear bearings 24R and 24L, respectively, penetrating sides 26R and 26L of operating handle 30.

Load binding tool 10 further comprises a second coupler-tension member 34 having a second coupler link 36 provided at one end connected to a second chain hook 38, or the like, by a chain link 40. Chain hook 38 can be used to grasp a second load binding tension member (not shown), such as, a chain, rope, cable or the like.

A connector pin bearing 44 is provided proximate the other end of second coupler-tension member 34 to which is journaled tension connector pin 46. The ends of tension connector pin 46 are journaled, respectively, to right and left major gear members 50 (50R and 50L). Right and left major gear members 50R and 50L comprise, respectively, right and left gear teeth 52R and 52L along their outer periphery and right and left disc shafts 54R and 54L. Right and left gear disc shafts 54R and 54L are journaled, respectively, to right and left major gear bearings 56R and 56L penetrating the right and left sides 26R and 26L of operating handle 30. Major gear teeth 52R and 52L are adapted to engage minor gear teeth 58R and 58L.

It will be particularly noted that the longitudinal axis of rotation 60 of tension connector pin 46 is disposed parallel to and spaced apart from the axis of rotation 62 of major gear members 50R and 50L. It will also be noted that the approximate gear ratio of major gear members 50R and 50L to minor gear members 20R and 20L is illustrated to be approximately 2:1. For this ratio, a rotation of minor gear members 20R and 20L of roughly 180 degrees will result in a rotation of major gear members 50R and 50L of roughly 90 degrees. Depending upon the operational arc of operating handle 30, it can be seen that other gear ratios can be used to obtain a different mechanical advantage.

OPERATION

In FIG. 1, load binding tool 10 is shown in its closed or full tension position. That is, first coupler-tension member 12 and second coupler-tension member 34 are drawn toward each other to pull their respective coupler links 14 and 36 closer together. This would result in pulling or increasing the tension on the connected load binding chains or tension members.

With reference to FIGS. 3 and 4, there is illustrated the positions of the various elements of load binding tool 10 as operating handle 30 is moved progressively from the fully closed position (FIG. 1) to the partially open position (FIG. 3) to the fully open position (FIG. 4).

Referring to FIG. 4, load binding tool 10 is shown in the fully open position. That is, first coupler tension member 12 and second coupler-tension member 34 are pushed away from each other or spread apart by the rotation of operating handle 30 about left and right major gear disc shafts 50L and 50R, respectively.

Using FIG. 4 as the starting point, the steps in the operation of load binding tool 10 of the present invention are as follows:

The load binding tension members (not shown) are connected to the respect chain hooks that are connected to the end of first coupler-tension member 12 and second coupler tension member 34. It will be noted that minor gear teeth 58 (58L and 58R) engage major gear teeth 52 (52L and 52R) proximate the clockwise end of the gear circumference. It will also be noted that the longitudinal axis of rotation 60 of tension connector pin 46 has been rotated to about the 2:00 o'clock position relative to the spaced apart and parallel axis of rotation 62 of major gear disc shaft 54 (54L and 54R).

Referring to FIG. 3, operating handle 30 has been rotated in a clockwise direction to about the half-way point between the fully open position of FIG. 4 and the full closed position of FIG. 1. In this position, it will be noted that midpoint of minor gear teeth 58 (58R and 58L) mesh proximate the midpoint of major gear teeth 52 (52R and 52L).

It will also be noted that the longitudinal axis of rotation 60 of tension connector pin 46 has been rotated to about the 4:00 o'clock position relative to the spaced apart and parallel axis of rotation 62 of major gear disc shaft 54 (54R and 54L). First coupler-tension member 14 and second coupler-tension member 34 have also been moved closer together.

Referring to FIG. 1, operating handle 30 has been further rotated in a clockwise direction to its fully closed position. In this position is will be noted that opposite end of minor gear teeth 58 (58R and 58L) mesh with the opposite end or major gear teeth 52 (52R and 52L) when compared with FIG. 4.

It will also be noted that the longitudinal axis of rotation 60 of tension connector pin 46 has been rotated to about the 10:00 o'clock position relative to the spaced apart and parallel axis of rotation 62 of major gear disc shaft 54 (54R and 54L). In this position, the line of tension passing through axis of rotation 60 pulling to the right is above the line of tension passing through axis of rotation 62. The resulting force on major gear members 50 (50R and 50L) is in a clockwise direction tending to hold minor gear members 20 (20R and 20L), and handle 30 journaled to minor gear shafts 18 (18R and 18L) in the closed position. Thus the rotation of connector pin 46 about the axis of rotation 62 of major gear disc shafts 54 (54R and 54L) will result in locking the load binding tool 10 of the present invention in the closed position.

Although the load binding tool 10 of the present invention has been described in detail, other configurations can be conceived Therefore, this invention is not intended to be limited in any way except as described in the following claims.

I claim:

1. An apparatus for applying tension to a load binding tension member comprising
    an operating handle comprising
    a major gear journaled to said handle
    a first coupler-tension member having one end pivotally connector to said major gear and the other end connected to a load binding tension member,
    a second coupler-tension member having one end connected to a load binding tension member,
    a minor gear connected to said operating handle and journaled to the other end of said second coupler-tension member, said minor gear engaging said major gear, and
    the gear ratio of said major gear and said minor gear combination being sufficient to cause the axis of rotation of the point of connection of said first coupler-tension member, pivotally connected to said major gear, to be offset relative to the axis of rotation of the point of connection of said second coupler-tension member, connected to said minor gear, to lock said apparatus for applying tension to a load binding tension member in the maximum tension condition when the operating handle is in the fully closed position.

2. The apparatus for applying tension to a load binding tension member as claimed in claim 1 further comprising
    the point of connection of said first coupler-tension member to said major gear being spaced apart from the axis of rotation of said major gear.

3. An apparatus for applying tension to a load binding tension member comprising
    a first coupler-tension member comprising
    means proximate one end of said first coupler-tension member for connecting said first tension member to a load binding tension member,
    a second coupler-tension member comprising
    means proximate one end of said second coupler-tension member for connecting said second tension member to a load binding tension member, and
    means defining a second tension member bearing proximate the other end of said second coupler-tension member,
    a major gear member comprising
    a set of major gear teeth,
    a major gear disc shaft, and
    means defining a coupler connector pin bearing having its axis of rotation spaced apart and parallel to the axis of rotation of said major gear disk shaft,
    a minor gear member comprising a set of minor gear teeth adapted to engage said major gear teeth, and a minor gear shaft attached to the end of said first coupler tension member distal said means for connecting said first coupler-tension member to a load binding tension member, an operating handle comprising a minor gear bearing journaled to said minor gear shaft, a major gear bearing spaced apart from said minor gear bearing and journaled to said major gear disc shaft a coupler connector pin having a longitudinal axis of rotation and journaled to both said major gear member coupler connector pin bearing and to said second tension member bearing, and the gear ratio of said major gear member and said minor gear member being sufficient to cause the axis of rotation of said major gear disc shaft to be offset relative to the axis of rotation of said first coupler connector pin to lock said apparatus for applying tension to a load binding tension member in its maximum tension condition when the operating handle is in its fully closed position.

4. An apparatus for applying tension to a load binding tension member comprising an operating handle comprising means defining a major gear disc shaft bearing proximate one end thereof, and means defining a minor gear shaft bearing spaced apart from said major gear disc bearing, a major gear member comprising a major gear disc shaft journaled to said operating handle major gear disc bearing, a set of major gear teeth, and means defining a coupler connector pin bearing having its axis of rotation spaced apart and parallel to the axis of rotation of said major gear disk shaft, a minor gear member comprising a minor gear shaft journaled to said operating handle minor gear shaft gearing, and a set of minor gear teeth adapted to engage said major gear teeth, a first coupler-tension member comprising means proximate one end of said first coupler-tension member for connecting said first tension member to a load binding tension member, and means proximate the other end of said first coupler-tension member for attaching said minor gear shaft to said first coupler-tension member, a second coupler-tension member comprising means proximate one end of said second coupler-tension member for connecting said second tension member to a load binding tension member, and means defining a second tension member bearing proximate the other end of said second coupler-tension member, a coupler connector pin journaled to both said major gear member coupler connector pin bearing and to said second tension member bearing, and the gear ratio of said major gear member and said minor gear member being sufficient to cause the axis of rotation of said major gear disc shaft to be offset relative to the axis of rotation of said first coupler connector pin to lock said apparatus for applying tension to a load binding tension member in its maximum tension condition when the operating handle is in its fully closed position.

5. An apparatus for applying tension to a load binding tension member comprising an operating handle comprising means defining a major gear disc shaft bearing proximate one end thereof, and means defining a minor gear shaft bearing spaced apart from said major gear disc bearing, a first coupler-tension assembly comprising a minor gear member, a minor gear member shaft journaled to said minor gear shaft bearing and attached to said minor gear member, a first coupler tension member connected proximate one end to said minor gear member shaft and connected at the other end, to a load binding tension member, a major gear member comprising a major gear disc shaft journaled to said operating handle major gear disc bearing, and means defining a coupler connector pin bearing having its axis of rotation spaced apart and parallel to the axis of rotation of said major gear disk shaft, a second coupler-tension member comprising means proximate one end of said second coupler-tension member for connecting said second tension member to a load binding tension member, and means defining a second tension member bearing proximate the other end of said second coupler-tension member, a coupler connector pin journaled to both said second tension member bearing and said coupler connector pin bearing of said major gear member, and means for causing the axis of rotation of said major gear disk shaft to be offset relative to said coupler connector pin to lock said apparatus for applying tension to a load binder tension member in its maximum tension condition when said operating handle is in its fully closed position.

* * * * *